United States Patent Office 2,779,408
Patented Jan. 29, 1957

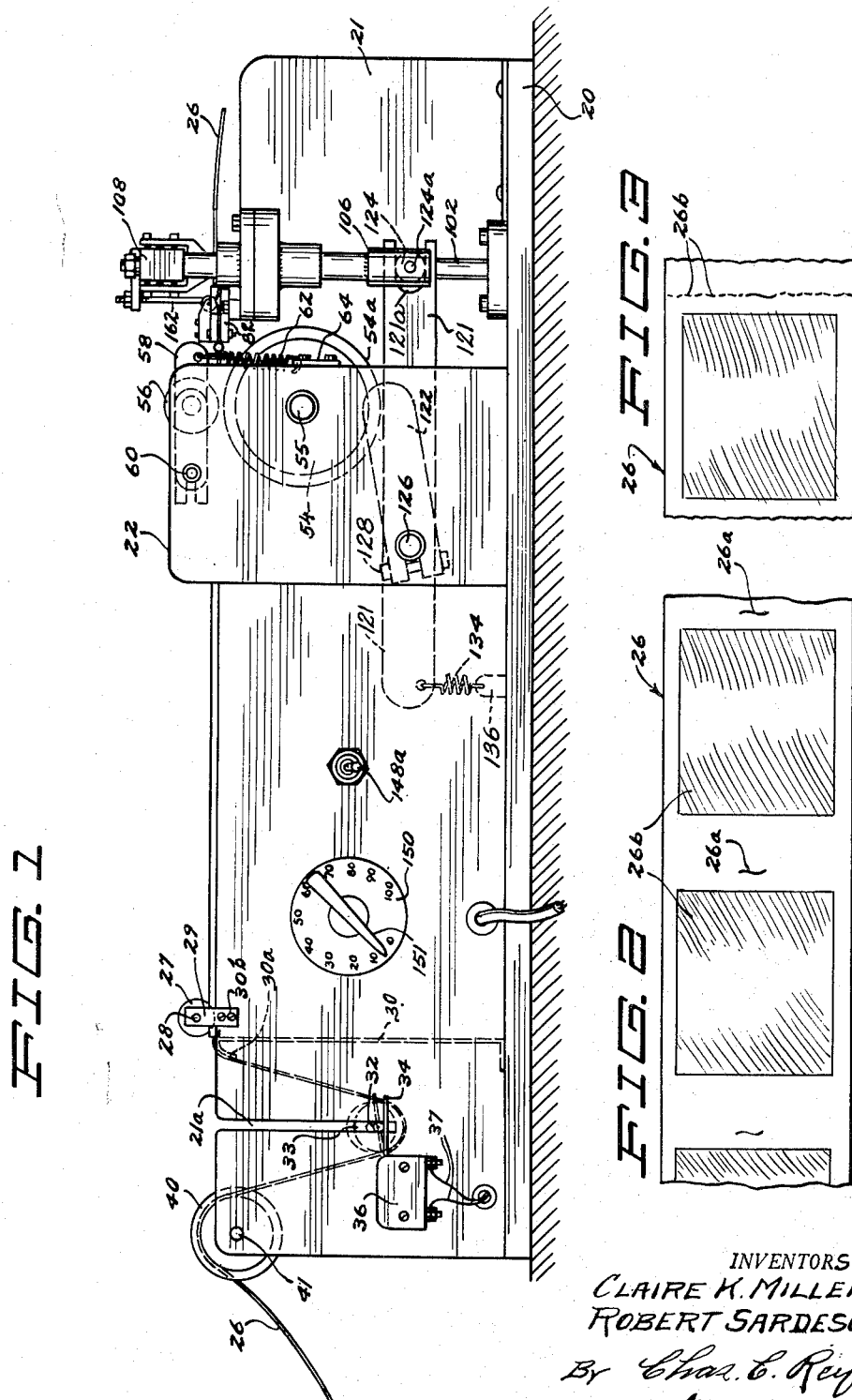

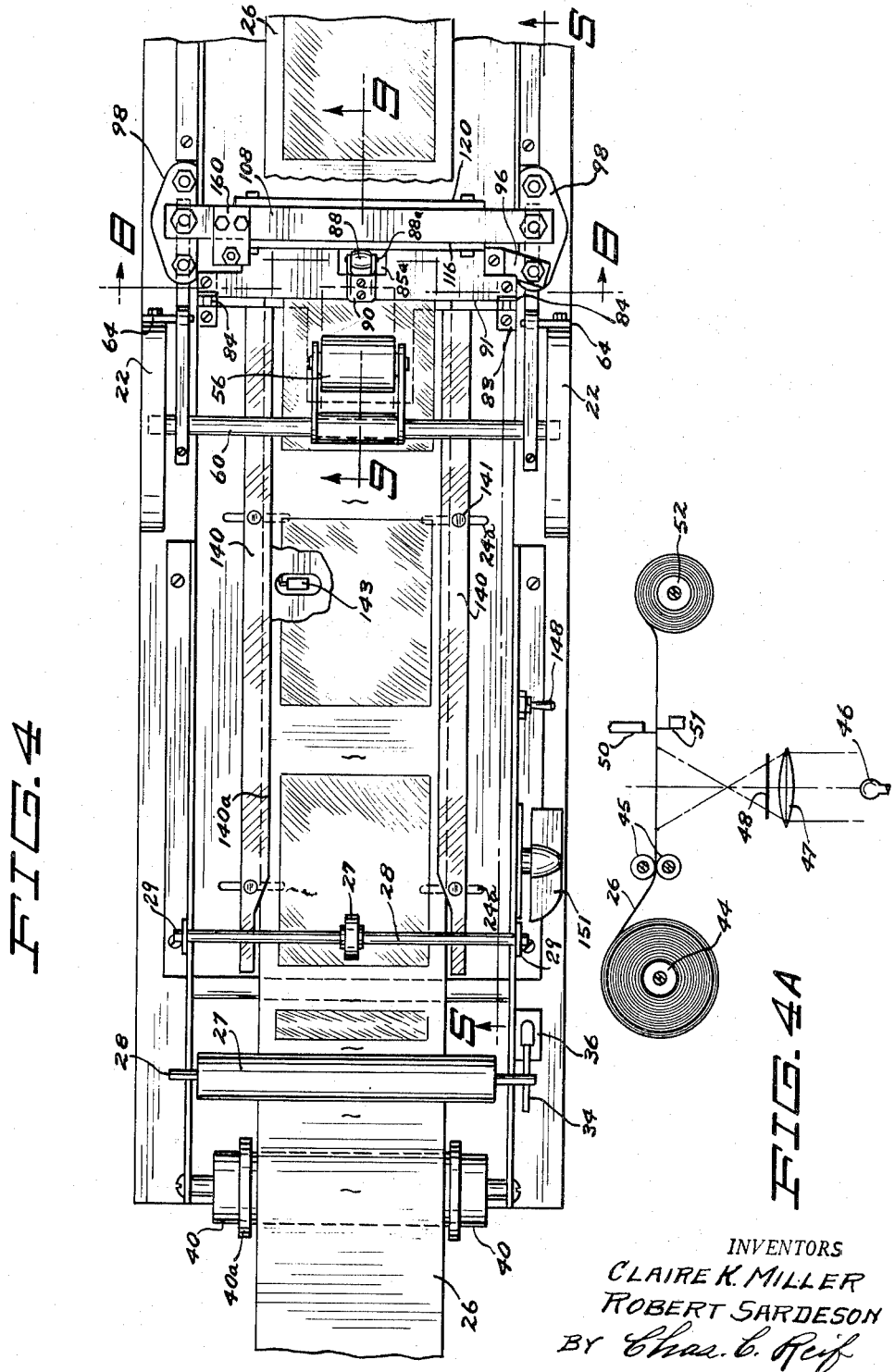

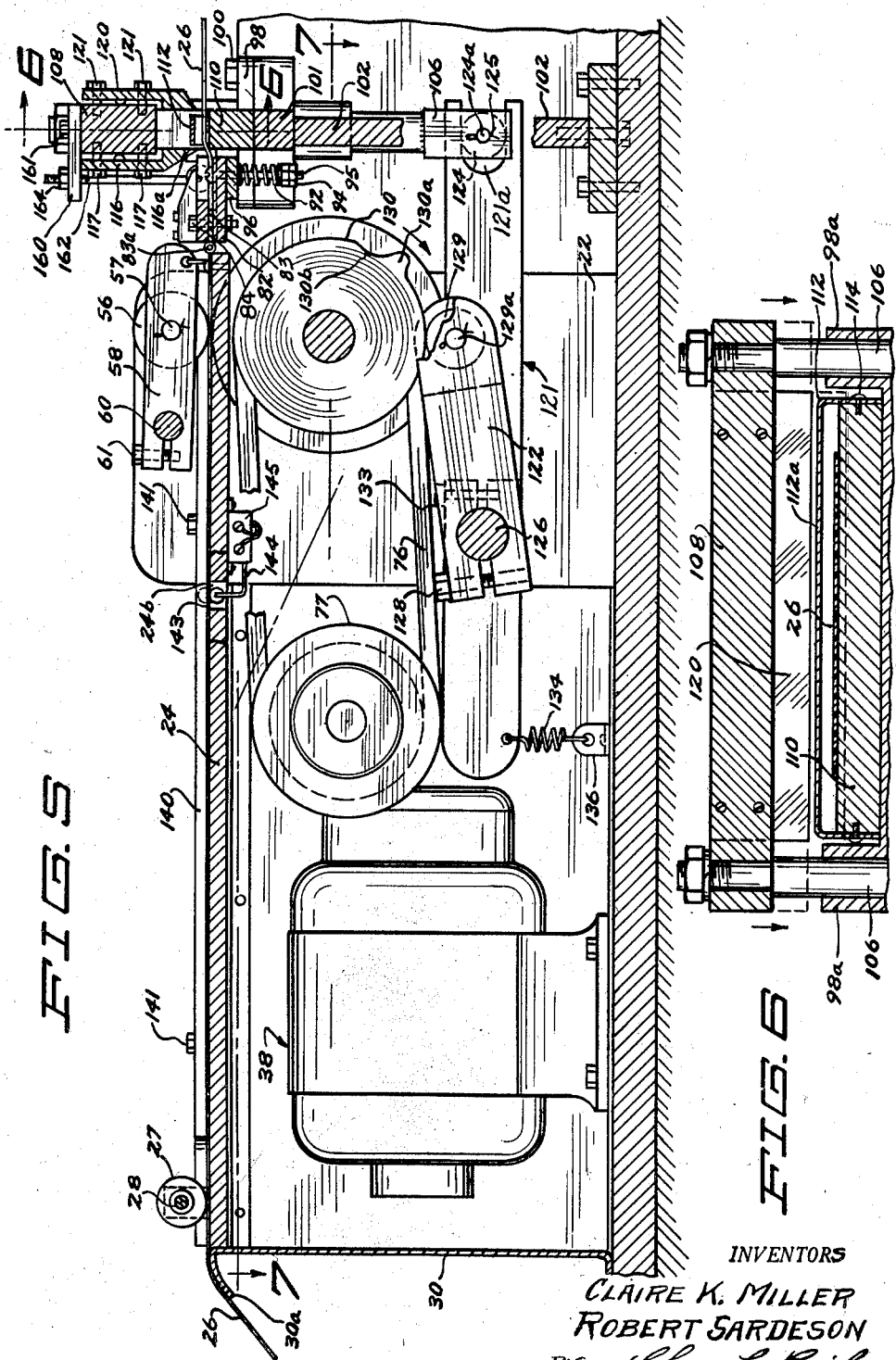

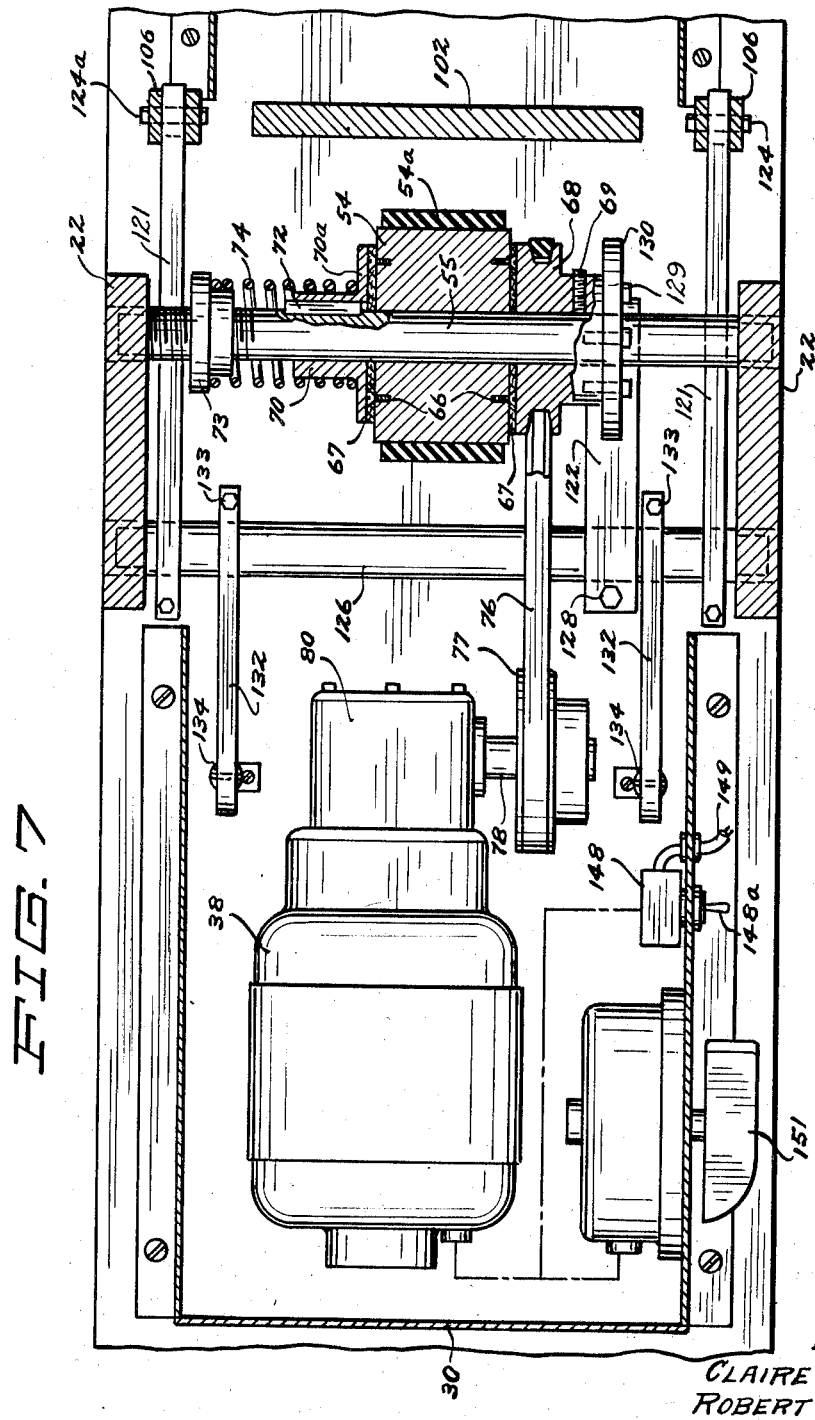

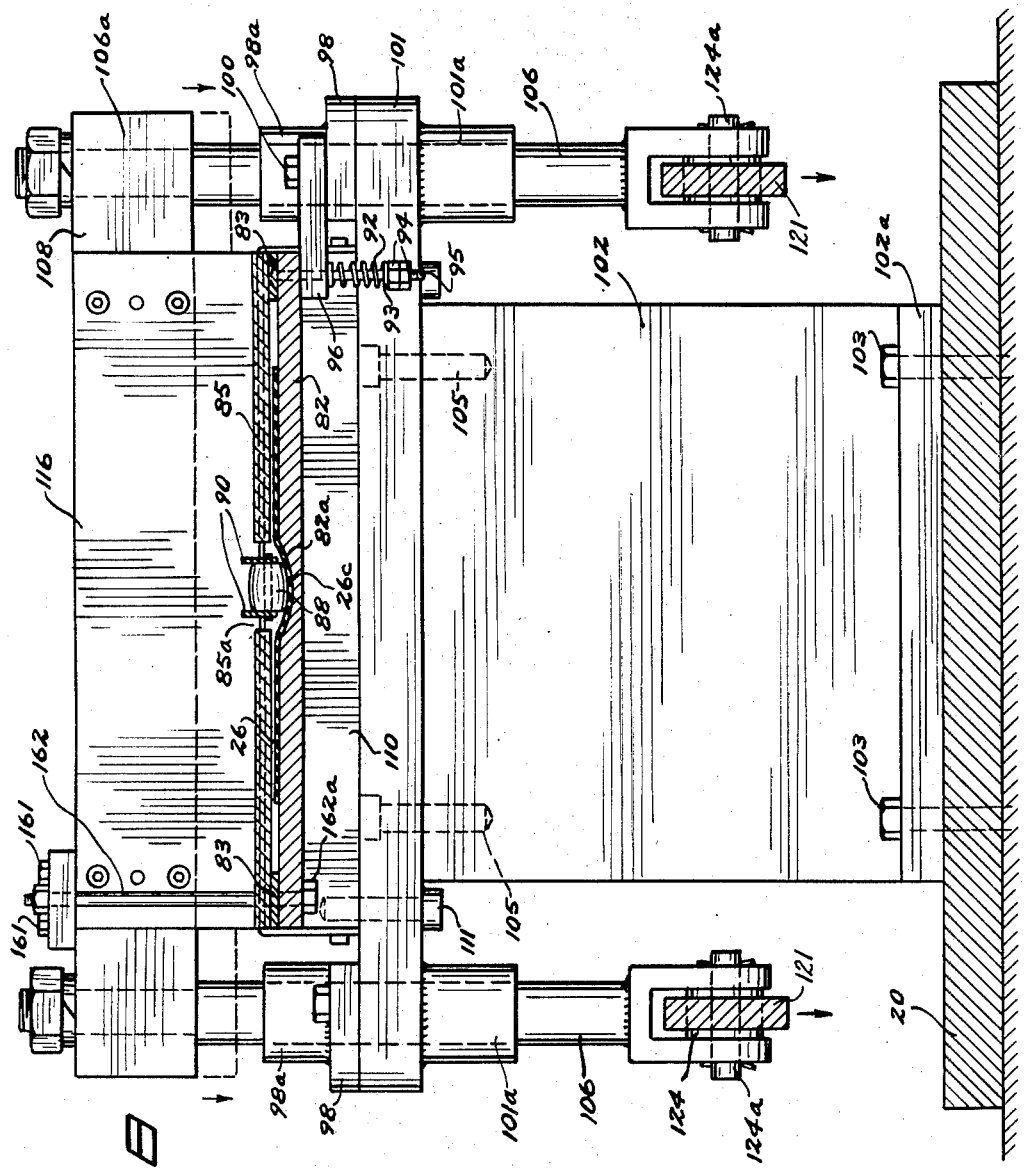
Jan. 29, 1957 — C. K. MILLER ET AL — 2,779,408
METHOD AND APPARATUS FOR HANDLING PRINT STRIP
Filed June 22, 1953 — 6 Sheets-Sheet 5
INVENTORS
CLAIRE K. MILLER
ROBERT SARDESON
BY Chas. C. Reif
ATTORNEY

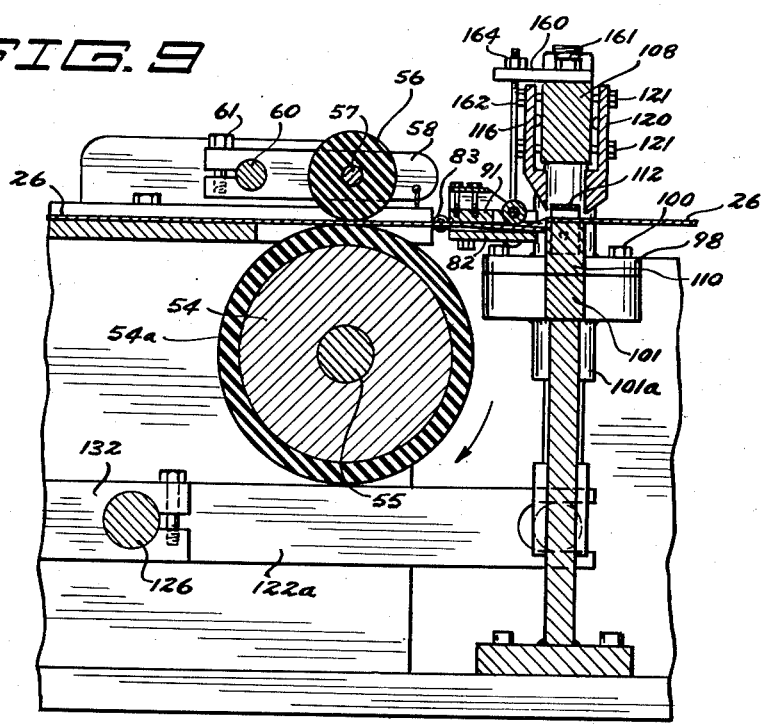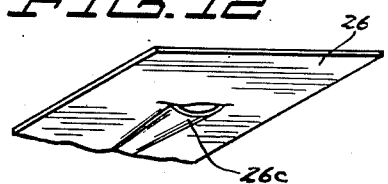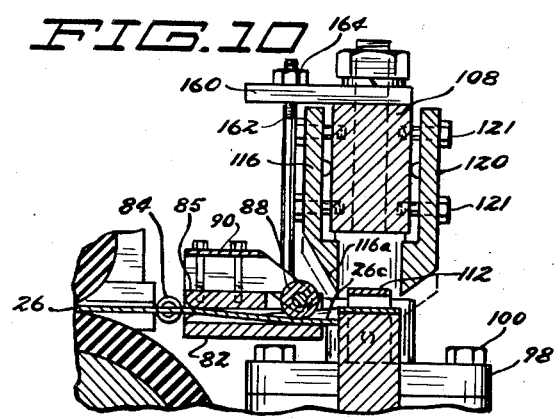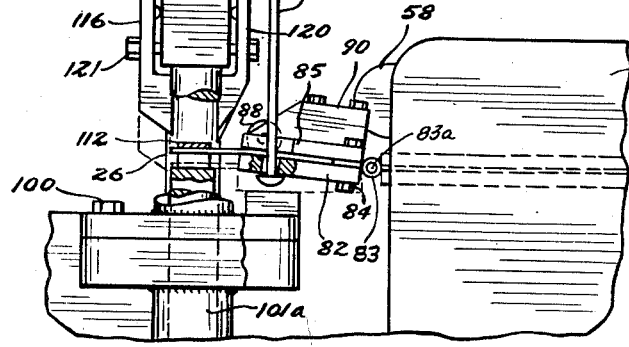

2,779,408

METHOD AND APPARATUS FOR HANDLING PRINT STRIP

Claire K. Miller and Robert Sardeson, Minneapolis, Minn., assignors to Pako Corporation, Minneapolis, Minn., a corporation of Delaware Application June 22, 1953, Serial No. 363,284

18 Claims. (Cl. 164—17)

This invention relates to a method and apparatus for handling a photographic strip. While various photographic and other strips could be handled in accordance with the invention, the method and apparatus is illustrated as applied to a strip of photographic prints. Photographic prints are now commonly made in one long strip having spaces between the various images thereon. It is desirable to cut the prints or sever the same at the spaces between the images.

It is an object of this invention to provide a method and apparatus for handling a photographic strip in which the strip is provided with means so that when the strip is progressed, said means can be brought into engagement with a stop member, which member acts to stop the progress of the strip so that the same can be severed.

It is a further object of the invention to provide a method and apparatus for handling a strip of photographic prints in which the strip is provided with transverse slits in the spaces between the images thereon and in which a portion of the strip adjacent said slit is moved out of the plane of the strip thus forming a projection so that as the strip is progressed said projection may contact a stop member and stop the progress of the strip so that the same can be severed.

It is another object of the invention to provide a machine for handling a photographic strip having spaced images thereon and provided with transverse slits in the spaces between said images comprising a support for said strip, means for frictionally progressing said strip, means in line with said slits pressing against said strip so that a portion of said strip adjacent each of said slits is moved out of the plane of said strip to form a projection, a stop member against which said projection is moved so that said strip is stopped, and means for severing said strip while so stopped.

It is also an object of the invention to provide such an apparatus as set forth in the preceding paragraph in which said means for progressing said strip includes a roller engaging said strip, a driving shaft and a member secured to said shaft and pressing against said roller to frictionally drive the same so that when said strip is stopped, said roller will be stopped.

It is still further an object of the invention to provide such a machine as set forth in the preceding paragraph save one, together with means for relatively moving said strip and stop member so that said projection is moved out of line with said stop member so that said strip can again be progressed.

It is another object of the invention to provide a machine for handling a photographic strip having spaced images thereon and having transverse slits therein in the spaces between said images comprising a support for said strip, means for frictionally progressing said strip on said support, a table aligned with said support and swingable about a horizontal axis, a roller in longitudinal alignment with said slits, means for pressing said roller against said strip, a stop member, a cutting member for severing said strip, said roller acting to move a portion of said strip adjacent each of said slits out of the plane of said strip, which portion engages said stop member and stops the progress of said strip, together with means for swinging said table to move said projection out of line with said stop member so that said strip can again be progressed.

It is still another object of the invention to provide such a machine as set forth in the preceding paragraph, together with a member connected to said cutting member, a lever connected to said last mentioned member, a roller carried by a portion of said lever, a rotatable cam engaging said roller for moving said lever and moving said cutting means to sever said strip, and means for returning said member and cutting member to normal position and for swinging said table to move said projection out of line with said stop member so that said strip may again be progressed.

These and other objects and advantages of the invention will be fully set forth in the following description made in connection with the accompanying drawings in which like reference characters refer to similar parts throughout the several views and in which:

Fig. 1 is a view in side elevation of the machine embodying this invention;

Fig. 2 is a plan view of a photographic strip handled by said machine;

Fig. 3 is also a plan view of a portion of a strip handled by said machine;

Fig. 4 is a top plan view of said machine with a photographic strip in position therein;

Fig. 4A is a diagrammatic view in longitudinal vertical section illustrating the piercing of the strip to form slits therein;

Fig. 5 is a longitudinal vertical section taken on line 5—5 of Fig. 4, as indicated by the arrows;

Fig. 6 is a transverse vertical section taken on line 6—6 of Fig. 5, as indicated by the arrows;

Fig. 7 is a horizontal section taken on line 7—7 of Fig. 5, as indicated by the arrows;

Fig. 8 is a transverse vertical section taken on line 8—8 of Fig. 4, as indicated by the arrows;

Fig. 9 is a partial longitudinal vertical section taken on line 9—9 of Fig. 4;

Fig. 10 is a partial vertical section similar to Fig. 9 and shown on an enlarged scale;

Fig. 11 is a partial view partly in side elevation and partly in vertical section; and Fig. 12 is a partial perspective view of a photographic strip used.

Referring to the drawings, a machine is shown comprising a base plate 20 and vertical frame members in the form of side plates 21. Other side plates 22 extend for a comparatively short distance longitudinally of the frame and are of greater thickness than plates 21. A horizontal plate 24 is disposed adjacent the top of said side plates 21, the same having a flat top and forming a support for a photographic strip 26. A roller 27 extends transversely above plate 24 adjacent one end of the machine and is carried on trunnions 28 journaled in brackets 29 secured by screws 30b to the side plates 21. A vertical plate 30 extends downwardly adjacent the brackets 29 and is provided with a downwardly curved end 30a. Plates 21 are provided with a vertical slot 21a in which is movable the trunnions 32 of a roller 33. Trunnions 32 normally engage a bar 34 forming an actuating member of an electric switch 36 supported on one of the plates 21. Conductors 37 extend from switch 36 to an electric motor 38. Another roller 40 is carried on trunnions 41 journaled in the plates 21. Roller 40 has collars 40a adjacent its ends forming guides for strip 26. The strip 26 runs over the roller 40, under the roller 33 and under the roller 27.

In Fig. 4A a diagrammatic view is shown of a printing machine for the photographic strip used. The unexposed strip unwinds from a roll 44 and moves between feed rolls 45 to a position of exposure where it is printed by light from a light source or bulb 46 directed through a lens 47 and a negative 48. After such exposure the strip is provided with transverse slits 26a, as shown in Fig. 2, which are located in the space between the images 26b printed on the strip. The slits are made by a reciprocating knife or cutter 50 cooperating with a cutting member 51. The exposed strip is then wound on a takeup roll 52. Usually the exposed strip is then processed in the usual manner and moved through a drier. From the drier the strip passes to the present machine and over roll 40.

The strip 26 is moved or progressed on the support 24 by a roller 54 which is journaled on a driving shaft 55. Roller 54 preferably has a peripheral portion 54a which will be made of rubber or similar resilient or yielding material. A roller 56 is carried on a shaft 57 which is journaled in the lever arms 58 secured to a rod 60 which is journaled in the plates 22. Arms 58 are divided adjacent rod 60 and clamped to said rod by headed screws 61. Arms 58 are moved downwardly to move roller 56 against the strip 26 by springs 62 secured to said arms and secured at their other ends to brackets 64 bolted to the sides of plates 22. Roller 56 is preferably made of rubber or similar material. Roller 54 has secured to each side thereof by screws 66, plates of frictional material 67. A driving pulley 68 is secured to shaft 55 in any suitable manner, as by the set screw 69. A member 70 is splined to shaft 55 by the key 72 and is slidable longitudinally of said shaft. A collar 73 is secured to shaft 55 and a compression coiled spring 74 engages collar 73 at one end and at its other end engages a plate-like portion 70a of member 70. Member 70 is thus pressed against the friction plate 67 at one side of roller 54 and the friction plate 67 at the other side of said roller is pressed against the side of pulley 68. Spring 74 extends over the cylindrical hub portion of member 70 and also over a reduced portion of collar 73. Collar 73 is threaded on shaft 55 and can be moved to different positions thereon to vary the compression of spring 74. Roller 54 is thus frictionally driven from shaft 55. A belt 76 runs over pulley 68 and also over a pulley 77 secured to a shaft 78 extending from a reduction gearing contained in a casing 80 secured to the casing of motor 38. Pulleys 68 and 77 are provided with peripheral grooves of trapezoidal shape and belt 76 is of trapezoidal shape in cross section.

A table 82 is provided and has a top surface substantially in the same plane as the top of supporting member 24. A plate 85 overlies table 82 and is spaced a short distance above the top of table 82. Plate 85 has an opening 85a formed therein. Table 82 is swingable about the axis of pivots 83a of a pair of hinges 83 secured to table 82 and plate 24 by screws 84. A roller 88 has trunnions 88a journaled in the arms of a bracket 90 bolted to plate 85. As shown in Fig. 4, roller 88 has a periphery convexly curved in longitudinal radial section. Roller 88 extends into opening 85a. Table 82 is provided with a groove or trough 82a extending longitudinally thereof and which has a concavely curved bottom, as shown in Fig. 8. Roller 88 is pressed against the strip 26 by a compression coiled spring 92, one end of which bears against a washer 93 overlying a pair of nuts 94 threaded on a rod 95 which extends through a bracket 96 bolted to a member 98. Rod 95 also extends through table 82 and has a head engaging the top of said table. There are two of the members 98 and the same are bolted by headed bolts 100 to a transversely extending member 101 which is supported on a bracket 102 having a flange 102a at its bottom secured to base plate 20 by the headed bolts 103. Member 101 is bolted to bracket 102 by the bolts 105 having countersunk heads. Members 98 have upstanding hub portions 98a and members 101 have downwardly extending hub portions 101a.

Rods 106 are vertically slidable in members 98 and 101 and have reduced portions 106a at their upper ends extending through a cross-head 108 which extends transversely of the machine well above the plane of the strip 26. A member 110 is supported on member 101 and secured thereto by the headed bolts 111. A plate-like member 112 of channel shape in cross section is secured to the sides of 110 by bolts 114 and has a horizontal top portion 112a extending transversely over member 110 some distance above the plane of the strip 26.

A knife or piercing element 116 is secured to one side of cross-head 108 by the headed bolts 117. Member 116 has a beveled end forming a sharp edge and said edge is provided with a plurality of adjacent recesses or scallops 116a. Member 116 is reciprocated with the cross-head 108 and makes a multiplicity of perforations 26b in the strip, as shown in Fig. 3. Another cutting member 120 is secured to the side of cross-head 108 opposite member 116 by the headed bolts 121. Member 120 has a beveled lower end and forms a cutting knife which moves along member 110 to sever the strip 26.

The members 106 have forks at their lower ends and a roller 124 is carried on trunnions 124a journaled in the arms of each of said forks. Trunnions 124a are provided with cotter pins 125 at their ends. Rollers 124 are respectively located in slots 121a in the forward ends of levers 121 journaled on a shaft 126 which extends between and is journaled in the side plates 22. Tensile coiled springs 134 have one of their ends respectively secured adjacent the rear ends of levers 121 and have their other ends secured respectively to brackets 136 in turn secured to base plate 20. An arm 122 is secured to shaft 126, the same having a kerf at its rear end and having a screw 128 extending therethrough and clamping said arm on shaft 126. Arm 122 has a roller 129 carried therein at its free end, which roller engages the periphery of a cam 130 secured by a plurality of circumferentially spaced bolts 131 to one end of member 68. The free end of arm 122 is bifurcated and roller 129 is disposed between the sides of the fork thus formed on arm 122b and has trunnions 129a journaled in the sides of said fork. Cam 130 has a projection 130a on its periphery and adjacent said projection, and at one side thereof has a depression 130b. A pair of arms 132 are clamped to shaft 126 by headed bolts 133 respectively passing through kerfs formed in the ends thereof.

A bar 160 is secured to the top of cross-head 108 by the headed bolts 161. A rod 162 extends through bar 160, the same having a threaded end receiving a nut 164 engaging the top of bar 160. Rod 162 extends downwardly through table 82 and has a head 162a engaging the bottom of table 82.

A pair of longitudinally extending guide members 140 or plates extend along the sides of strip 26 and are provided with longitudinally extending slots or channels 140a in which the edge portions of strip 26 moves. Members 140 are secured by headed screws 141 and may be adjusted laterally to suit different widths of strips by moving screws 141 in slots 24a in supporting member 24.

A roller 143 is disposed in a slot 24b in plate 24 and is journaled in an arm 144 forming the actuating arm of a switch 145. Roller 142 can move upwardly to the dotted line position shown in Fig. 5 when no strip is being moved on plate 24. When said roller moves to said upper position, it operates switch 145 and shuts off the motor 38. A main control switch 148 is provided from which conductors 149 lead to a suitable source of current. Switch 148 has an operating handle 148a which is accessible at the side of the machine, as shown in Fig. 1, and can be moved to start and stop motor 38. A rheostat 150 is shown in Fig. 1 having a movable hand 151 which can be moved to different positions to vary the speed of motor 38.

In operation, the strip 26 will be threaded in the machine, the same being placed over pulley 40 and under roller 33 and under roller 27 above supporting plate 24. The end of the strip will be moved between rollers 54 and 56. The motor can now be started by operating switch 148. The strip will now move along between rollers 54 and 56 and will move over table 82 and under plate 85. As the strip moves under roller 88, said roller will be pressed downwardly on the strip and when one of the slits 26a approaches roller 88 the strip will be pressed downwardly into the groove 82a in table 82 and a portion 26c of strip 26, shown in Figs. 8 and 12, is moved out of the plane of strip 26 and the same has an edge formed by one side of the slit 26a. As strip 26 is moved, the end of the projection 26c moves against member 110, as shown in Figs. 9 and 10. This stops the movement of strip 26 and the rotation of roller 54 is stopped so that shaft 55 now merely turns in roller 54. When the strip is thus stopped, cam 130 which is rotated with shaft 55 is then positioned where projection 130a encounters or engages a roller 129. This swings lever 122 downwardly, as shown in Figs. 1 and 5, and lever 22 moves members 106 downwardly, thus moving the cross-head 108 downwardly. Cutting member 116 is moved downwardly and makes a line of staggered perforations in the strip, as shown as 26b in Fig. 3. Cutting member 120 is moved downwardly and severs the strip 26 as it moves along the side of member 110. After projection 130a passes roller 129, springs 134 move the end of lever 122 and members 106 upwardly. Roller 129 drops into recess 130b and the members 106 move up a short distance. As members 106 and cross-head 108 thus move upwardly, they move bar 160 and rod 162 upwardly and rod 162 raises table 82 upwardly a short distance. Table 82 is moved up sufficiently to bring the strip 26 and its projection 26c above the top of member 110 so that the strip can now move past member 110. Member 110 thus provides a stop member for the strip. The member 112 is provided to keep the strip from moving too far vertically. Since the obstruction to the strip has now been removed, roller 54 will again be driven and the strip will be again advanced over table 82 until the roller 88 forms another projection adjacent the next slit 26a and the strip is again stopped. The operation of severing and perforating is again repeated. It will thus be seen that the roller 88 forms the projections 26c at each slit 26a and a strip is thus successively stopped and severed. The strip and projection 26c and member 110 are relatively moved and the strip again starts its motion. The prints are thus quickly and accurately severed between the images 26b. The strip is moved quite rapidly and the prints are cut at a speed of 100 per minute or more.

Should the strip 26 be under too great tension it will pull roller 33 upwardly and permit actuating bar 34 to move upwardly and open switch 36. This will stop the motor and rupture of the strip is prevented.

From the above description it will be seen that we have produced a fairly simple and very efficient machine and method for rapidly handling a photographic strip and cutting the same into the desired pieces. The machine operates entirely automatically and the strip is progressed and cut without any intervention of the operator.

The machine has been amply demonstrated in actual practice, found to be very successful and efficient and is now in commercial use.

The perforations 26b are made in the cut prints, so that said prints can be bent along said line when the prints are bound together adjacent said line. The prints can move about said line as a hinge.

It will of course be understood that various changes may be made in the form, details, arrangement and proportions of the apparatus and in the steps and sequence of steps of the method without departing from the scope of applicants' invention, which generally stated, consists in a method and apparatus capable of carrying out the objects above set forth, such as disclosed and defined in the appended claims.

What is claimed is:

1. A machine for handling a photographic strip having spaced images thereon and having transverse slits formed therein between said images and intermediate the sides of said strip having in combination, a member on which said strip is supported, means for progressing said strip longitudinally in one direction, means for pressing down on said strip adjacent said slit to move a portion of said strip out of the plane of said strip to form a curved edge disposed in a vertical plane, a member disposed to be engaged by said portion as said strip is moved in said direction for stopping said strip and the operation of said first mentioned means, and means for severing said strip between a pair of said images while so stopped.

2. The structure set forth in claim 1, said first mentioned member having a trough therein extending longitudinally thereof beneath said second mentioned means of segmental form in cross section into which said strip is pressed to form a curved edge in said strip disposed in a vertical plane, said means fitting in said trough.

3. The structure set forth in claim 2, said means comprising a roller with a convex periphery, and means for pressing said roller against said strip and into said trough.

4. The structure set forth in claim 1, said last mentioned means comprising a roller having a periphery, a longitudinal axial section of which is convex, means for pressing said roller against said strip, said member having a longitudinally extending trough therein beneath said roller, the bottom of said trough being transversely concave so that said roller fits in said trough.

5. A machine for handling a photographic strip having spaced images thereon and having transverse slits formed therein between said images and intermediate the sides of said strip having in combination, a member on which said strip is supported, means for progressing said strip, means for pressing down on said strip adjacent one of said slits to move a portion of said strip out of the plane of said strip, a member disposed to be engaged by said portion as said strip is moved for stopping said strip, and means for simultaneously severing said strip and making a row of perforations therein extending transversely thereof adjacent the line of said severing while said strip is so stopped said perforations permitting bending of the severed portions when bound together at one end to form a book.

6. A machine for handling a photographic strip having spaced images thereon and having transverse slits formed therein between said images and between the sides of said strip having in combination, a member on which said strip is supported in substantially flat condition, said member having a trough formed therein, means for progressing said strip, a roller disposed over said trough constructed and arranged to press down on said strip in line with said slit and under which said slit moves, said roller moving a portion of said strip downwardly into said trough and out of the plane of said strip, said portion having an edge formed by one side of said slit, a member adjacent which said strip moves engageable by said edge for stopping said strip, and means for severing said strip while so stopped.

7. The structure set forth in claim 6, means for lifting said strip and member to bring said edge out of line with said member so that said portion and edge can pass said member and said strip can again be moved.

8. A machine for handling a photographic strip having spaced images thereon and having transverse slits formed therein between said images and between the sides of said strip having in combination, means for progressing said strip comprising a shaft, a roller rotatable on said shaft, a member secured to said shaft and engaging said roller for frictionally driving the same, means for pressing a portion of said strip adjacent one of said slits out of the plane of said strip, a member disposed to be engaged by said portion for stopping said strip and roller whereby said shaft and first mentioned member can rotate relatively to said roller.

9. The structure set forth in claim 8, means for severing said strip while so stopped, and means for lifting said portion into position where it can pass said member whereby said roller will again progress said strip.

10. A machine for handling a photographic strip having spaced images thereon and having transverse slits formed therein between said images having in combination, a support for said strip, means for frictionally engaging and progressing said strip, a table adjacent said support over which said strip moves, said table being mounted to swing about a horizontal axis, a roller disposed above said table aligned with said slits and under which said slits pass, means for pressing said roller against said strip whereby said roller moves a portion of said strip adjacent said slit out of the plane of said strip, a stop member disposed to be engaged by said portion, a cutting member for severing said strip, means for moving said cutting member transversely of said strip to sever the same while so stopped, and means for swinging said table to bring said portion out of line with said stop member whereby said strip can be moved past said stop member.

11. A machine for handling a photographic strip having spaced images thereon and having transverse slits formed therein between said images having in combination, a support for said strip, means for frictionally engaging and progressing said strip, a table adjacent said support over which said strip moves, said table being mounted to swing about a horizontal axis, a roller disposed above said table aligned with said slits and under which said slits pass, means for pressing said roller against said strip whereby said roller moves a portion of said strip adjacent said slit out of the plane of said strip, a stop member disposed to be engaged by said portion, a cutting member for severing said strip, means for moving said cutting member to sever said strip, means for then moving said cutting member in the reverse direction and for swinging said table to bring said portion out of the plane of said stop member whereby said strip can again be moved.

12. A machine for handling a photographic strip having spaced images thereon and having transverse slits formed therein between said images having in combination, a support for said strip, means for frictionally engaging and progressing said strip, a table adjacent said support over which said strip moves, said table being mounted to swing about a horizontal axis, a roller disposed above said table aligned with said slits and under which said slits pass, means for pressing said roller against said strip whereby said roller moves a portion of said strip adjacent said slit out of the plane of said strip, a stop member disposed to be engaged by said portion, a cutting member for severing said strip, means for moving said cutting member comprising a rotatable cam, a member connected to said cutting means, a lever engaging said member, a roller carried by said lever for engaging said cam, said cam having a portion thereon for engaging said roller and moving said lever to move said cutting means downwardly, means for moving said lever after said portion of said cam has passed said roller to move said member and cutting means upwardly, and means moved upwardly with said cutting member for swinging said table upwardly and moving said portion of said strip above said stop member whereby said strip can again be progressed.

13. The structure set forth in claim 12, and means for returning said table to normal position.

14. A machine for handling a photographic strip having spaced images thereon and having transverse slits formed therein between said images having in combination, a support for said strip, means for frictionally engaging and progressing said strip; a table adjacent said support over which said strip moves, said table being mounted to swing about a horizontal axis, a roller disposed above said table aligned with said slits and under which said slits pass, means for pressing said roller against said strip whereby said roller moves a portion of said strip adjacent said slit out of the plane of said strip, a stop member disposed to be engaged by said portion, a cutting member for severing said strip, means for moving said cutting member comprising a rotatable cam, a member connected to said cutting member, a lever connected to said member, a roller carried by a portion of said lever disposed to engage said cam, said cam having a portion for moving said roller, said lever and member to move said cutting member and sever said strip, and means for swinging said table to bring said portion of said strip out of line with said stop member whereby said strip can again be progressed.

15. The method of moving and severing a photographic sheet having a plurality of spaced images thereon, which consists in advancing said strip, forming spaced comparatively short slits in said strip intermediate the sides of said strip, forming stop portions therein by depressing said strip adjacent one of said slits to form an edge at the lower side of said strip at said slit disposed in a vertical plane between a pair of said images, advancing said sheet to a position adjacent a stop member, stopping said strip by engagement of said stop portions with said stop member, and severing said strip between a pair of said images while said strip is so stopped.

16. The method of moving and severing portions from a strip having a plurality of spaced images thereon which consists in constantly gripping said strip between rollers one of which is driven, and progressing said strip in one direction by said rollers, forming comparatively short slits in said strip extending transversely thereof between said images and between the sides of said strip, depressing said strip into curved form through a zone extending longitudinally of said strip and through said slits to thus form an edge in a vertical plane at one side of said slits respectively, moving said edge with said strip in said direction to bring said edge against a stationary stop member to stop said strip and said roller and severing said stop strip between a pair of said images.

17. The method set forth in claim 16, with the added steps of lifting said strip so that said edge will pass over said stop member and again progressing said strip by said rollers.

18. The method of moving and severing a photographic strip having spaced images thereon which consists in progressing said strip, cutting a transversely extending comparatively short slit in said strip between a pair of said images and between the sides of said strip, moving a portion of said strip adjacent said slit out of the plane of said strip during such progression thus forming an edge of concavo-convex form disposed in a vertical plane, progressing said strip to a position adjacent a stop member to bring said edge against said member and stop said strip and the progression thereof and severing said strip between a pair of said images while so stopped.

References Cited in the file of this patent

UNITED STATES PATENTS

| | | |
|---|---|---|
| 734,215 | Bilgram | July 21, 1903 |
| 817,795 | McKee | Apr. 17, 1906 |
| 1,054,976 | McCauley | Mar. 4, 1913 |
| 1,481,183 | Browne | Jan. 15, 1924 |
| 1,746,032 | Ely | Feb. 4, 1930 |
| 2,049,135 | Reyser | July 28, 1936 |
| 2,156,049 | Boerger | Apr. 25, 1939 |
| 2,721,612 | Almgren | Oct. 25, 1955 |